United States Patent
Ohnuma

(10) Patent No.: US 8,235,276 B2
(45) Date of Patent: Aug. 7, 2012

(54) ULTRASONIC BONDING METHOD OF ELECTRIC WIRE

(75) Inventor: Kentaro Ohnuma, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/879,341

(22) Filed: Sep. 10, 2010

(65) Prior Publication Data

US 2011/0062218 A1    Mar. 17, 2011

(30) Foreign Application Priority Data

Sep. 14, 2009   (JP) ................. 2009-212292

(51) Int. Cl.
B23K 31/02 (2006.01)
(52) U.S. Cl. ............... 228/110.1; 228/173.2; 228/180.5
(58) Field of Classification Search .......... None
See application file for complete search history.

(56) References Cited

U.S. PATENT DOCUMENTS

| | | | | |
|---|---|---|---|---|
| 1,731,218 | A * | 10/1929 | Adams | 428/605 |
| 4,596,352 | A * | 6/1986 | Knapp | 228/1.1 |
| 4,817,814 | A * | 4/1989 | Coto et al. | 228/110.1 |
| 5,423,474 | A * | 6/1995 | Kanagawa et al. | 228/110.1 |
| 5,954,549 | A * | 9/1999 | Shinchi | 439/874 |
| 6,184,471 | B1 * | 2/2001 | Asakura et al. | 174/78 |
| 6,299,052 | B1 * | 10/2001 | Wnek et al. | 228/110.1 |
| 6,302,981 | B1 * | 10/2001 | Sakaguchi et al. | 156/73.1 |
| 2002/0000459 | A1 * | 1/2002 | Wnek et al. | 228/1.1 |
| 2003/0098332 | A1 * | 5/2003 | Loprire | 228/110.1 |
| 2004/0018777 | A1 * | 1/2004 | Vanden Wymelenberg et al. | 439/701 |
| 2004/0088857 | A1 * | 5/2004 | Fujimoto et al. | 29/871 |
| 2005/0199676 | A1 * | 9/2005 | Stroh et al. | 228/1.1 |
| 2005/0205641 | A1 * | 9/2005 | Takeuchi et al. | 228/1.1 |
| 2006/0068653 | A1 * | 3/2006 | Sakaguchi et al. | 439/877 |
| 2006/0169742 | A1 * | 8/2006 | Fujimoto et al. | 228/4.5 |
| 2007/0000890 | A1 * | 1/2007 | Steiner et al. | 219/124.34 |
| 2007/0068991 | A1 * | 3/2007 | Handel et al. | 228/1.1 |
| 2008/0128471 | A1 * | 6/2008 | Eberbach et al. | 228/1.1 |
| 2009/0218134 | A1 * | 9/2009 | Stroh et al. | 174/74 R |
| 2010/0170935 | A1 * | 7/2010 | Stroh et al. | 228/110.1 |

FOREIGN PATENT DOCUMENTS

| | | | | |
|---|---|---|---|---|
| DE | 2020004010775 | A | * | 1/2005 |
| EP | 133883 | A | * | 3/1985 |
| EP | 154709 | A | * | 9/1985 |
| JP | 2005-319483 | A | * | 11/2005 |
| JP | 2005-340106 | A | * | 12/2005 |
| JP | 2005-340107 | A | * | 12/2005 |
| JP | 2006-172927 | A | * | 6/2006 |
| JP | 2007-149421 | A | * | 6/2007 |

(Continued)

*Primary Examiner* — Kiley Stoner
(74) *Attorney, Agent, or Firm* — Sughrue Mion, PLLC

(57) ABSTRACT

In an ultrasonic bonding method of an electric wire in which the electric wire 1 in which a conductor end 7 made of plural core wires is exposed and a metallic connection terminal 19 formed by erecting two side walls 27 from a bottom surface are prepared and the conductor end is bonded to the connection terminal by applying ultrasonic vibration while the conductor end of the electric wire is positioned in the bottom surface between the two side walls of the connection terminal and is pushed, a cross section of the conductor end of the electric wire is made by being molded by press so that a thickness of a width direction between the side walls becomes thin toward at least one of the side positioned in the bottom surface of the connection terminal and the side to which the ultrasonic vibration is applied.

8 Claims, 10 Drawing Sheets

FOREIGN PATENT DOCUMENTS

| | | | | |
|---|---|---|---|---|
| JP | 2007-185706 A | * | 7/2007 | |
| JP | 2009-021176 A | * | 1/2009 | |
| JP | 2009-231079 A | * | 10/2009 | |
| JP | 2010044887 A | * | 2/2010 | |
| WO | WO 90/07808 A | * | 7/1990 | |
| WO | WO 2008/148813 A | * | 12/2008 | |

* cited by examiner

ULTRASONIC BONDING METHOD OF ELECTRIC WIRE

BACKGROUND

1. Field of the Invention

The present invention relates to an ultrasonic bonding method of an electric wire in which ultrasonic bonding of a conductor part of the electric wire made of plural core wires is performed to a metallic terminal.

2. Description of the Related Art

An ultrasonic bonding method is known conventionally as a method for connecting a conductor part of an electric wire to a metallic terminal. As one example of this ultrasonic bonding method, for example, a method in which an electric wire in which a conductor end made of plural core wires is exposed from an insulating outer skin and a connection terminal formed by erecting two side walls from a bottom surface are prepared and after the conductor end of the electric wire is first molded by press in a flat shape (flat plate shape), ultrasonic vibration is applied while this conductor end molded by press is positioned in the bottom surface between the two side walls of the connection terminal and is pushed by a horn and thereby, the conductor end is bonded to the connection terminal is disclosed (see Patent Reference 1). Consequently, properties of adhesion between the connection terminal and the conductor end molded by press are ensured, so that good bonding properties can be obtained.

Patent Reference 1: JP-A-2006-172927

Incidentally, according to Patent Reference 1, the conductor end is molded by press by being pressurized from a thickness direction in a state of regulating a width according to a dimension between the side walls of the connection terminal. As a result of this, the conductor end set in the connection terminal is pinched between the side walls and is supported. On the other hand, in the horn, a dimension of a width direction between the side walls is set smaller than a dimension of a width direction of the conductor end in order to prevent contact with the side walls at the time of applying pressure and vibration to the conductor end.

When such a horn is pushed on the conductor end set between the side walls of the connection terminal and ultrasonic vibration is applied, the conductor end is pushed on the horn and becomes deformed so as to spread in the width direction between the side walls and the core wires of the sides of the side walls become pushed on the side walls. When further application of ultrasonic vibration is continued, the core wires pushed on the side walls swell along the side walls and may reach a position higher than the upper ends of the side walls. The core wires swelling to the position higher than the side walls thus, for example, tend to become an obstacle in the case of insertion into a housing into which the connection terminal is inserted, and may also cause electrical trouble such as a short circuit in the case of having a deficiency of the core wires.

SUMMARY

A problem of the invention is to suppress swelling of a core wire in the case of performing ultrasonic bonding of a conductor end to a connection terminal.

In order to solve the problem described above, an ultrasonic bonding method of an electric wire of the invention is a method in which the electric wire in which a conductor end made of plural core wires is exposed and a metallic connection terminal formed by erecting two side walls from a bottom surface are prepared and the conductor end is bonded to the connection terminal by applying ultrasonic vibration while the conductor end of the electric wire is positioned in the bottom surface between the two side was of the connection terminal and is pushed, and is characterized in that a cross section of the conductor end of the electric wire is made by being molded by press so that a thickness of a width direction between the side walls becomes thin toward at least one of the side positioned in the bottom surface of the connection terminal and the side to which the ultrasonic vibration is applied.

That is, the cross section of the conductor end molded by press is formed so that the thickness of the direction set between the side walls of the connection terminal and pushed becomes thin toward the sides of the side walls. Therefore, even when the conductor end becomes deformed so as to spread in the width direction between the side walls at the time of applying the ultrasonic vibration, the amount of the core wires pushed on the side walls becomes small as the thickness of the sides of the side walls of the conductor end becomes thin, so that swelling of the core wires along the side walls can be suppressed.

Concretely, in the cross section of the conductor end of the electric wire, at least one of the side positioned in the bottom surface and the side to which the ultrasonic vibration is applied can be formed in, for example, a trapezoidal shape or a semicircular shape. Such shapes can simply be formed by press molding and thicknesses of both the shapes become thin toward the sides of the side walls, so that swelling of the core wires can be suppressed effectively. Further, the cross section of the conductor end may be formed by combining different shapes, for example, the side to which the ultrasonic vibration is applied is formed in the trapezoidal shape and the side positioned in the bottom surface is formed in the semicircular shape.

According to the invention, swelling of the core wire can be suppressed in the case of performing ultrasonic bonding of the conductor end to the connection terminal.

BRIEF DESCRIPTION OF THE DRAWINGS

FIG. 5(a) shows the cross-sectional shape before the ultrasonic bonding and FIG. 5(b) shows the cross-sectional shape after the ultrasonic bonding.

FIG. 6(a) shows the cross-sectional shape before the ultrasonic bonding and FIG. 6(b) shows the cross-sectional shape after the ultrasonic bonding.

FIG. 7(a) shows an external appearance of a press metal mold and FIG. 7(b) shows a cross-sectional shape of the conductor end after press molding.

FIG. 8(a) shows an external appearance of the press metal mold and FIG. 8(b) shows a cross-sectional shape of a conductor end after press molding.

FIG. 9(a) shows an external appearance of the press metal mold and FIG. 9(b) shows a cross-sectional shape of a conductor end after press molding.

FIG. 10(a) shows an external appearance of the press metal mold and FIG. 10(b) shows a cross-sectional shape of a conductor end after press molding.

FIG. 11(a) shows an external appearance of the press metal mold and FIG. 11(b) shows a cross-sectional shape of a conductor end after press molding.

DESCRIPTION OF THE PREFERRED EMBODIMENTS

One embodiment of an ultrasonic bonding method of an electric wire made by applying the invention will hereinafter be described with reference to the drawings.

In the present embodiment, an electric wire in which a conductor end made of plural core wires is exposed, a press metal mold by which the conductor end of this electric wire is molded by press, a connection terminal to which the conductor end is bonded, and an ultrasonic bonding apparatus for bonding the conductor end to the connection terminal are used.

Figure 1:
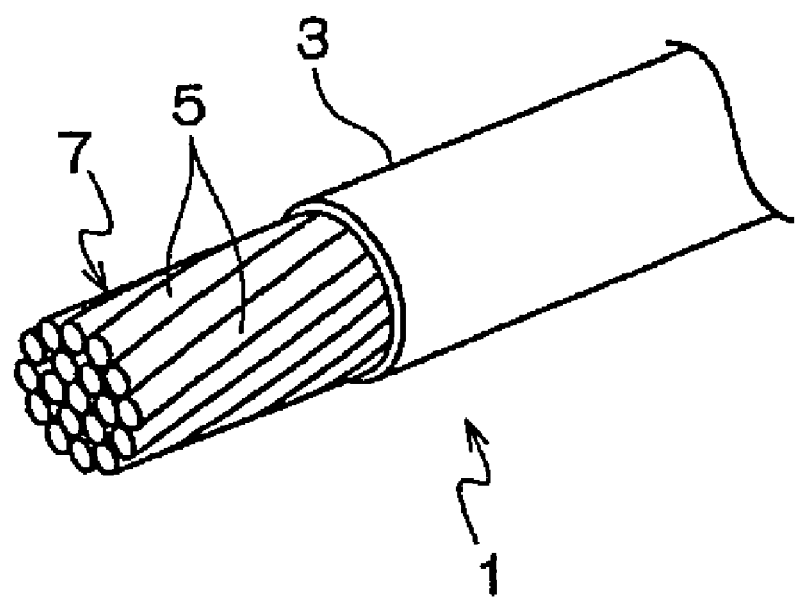
FIG. 1 is a perspective view showing an electric wire before a conductor end is molded by press in an ultrasonic bonding method of the electric wire to which the invention is applied.

As shown in FIG. 1, an electric wire with plural core wires 5 (hereinafter called a conductor end 7) exposed from an insulating outer skin 3 is prepared for an electric wire 1. In this electric wire 1, the conductor end 7 is molded by press by the press metal mold.

Figure 2:
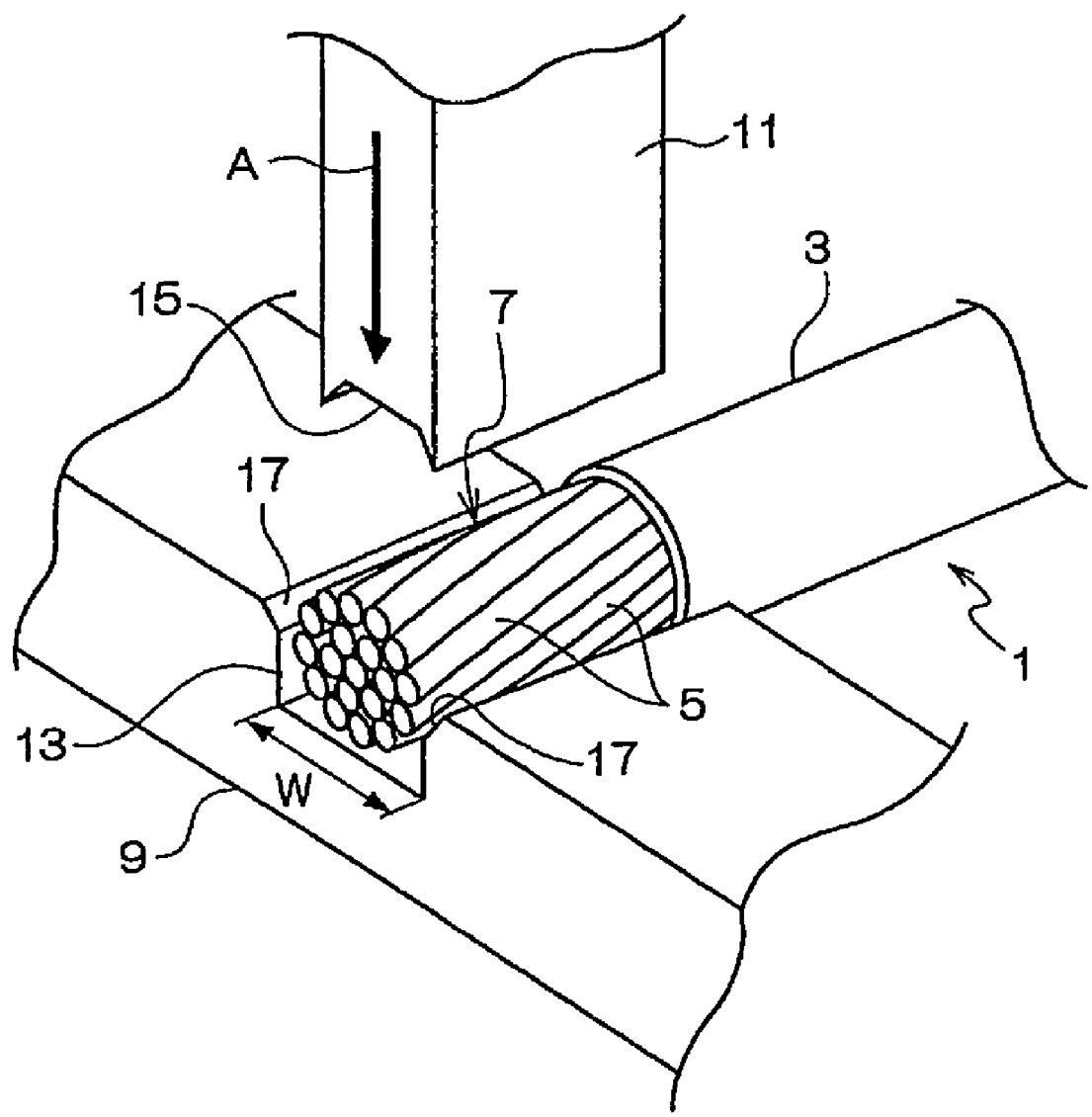
FIG. 2 is a perspective view describing a step of molding the conductor end of the electric wire by press in the ultrasonic bonding method of the electric wire to which the invention is applied.

The press metal mold includes a lower mold 9 and an upper mold 11 as shown in FIG. 2. A groove 13 in which the conductor end 7 of the electric wire 1 is received is formed in the lower mold 9. A groove 15 extending in the same direction as the groove 13 is formed in the upper mold 11, and the upper mold 11 is constructed so as to move downward relatively until a lower end surface in which this groove 15 is formed enters the inside of the groove 13 somewhat. The groove 13 and the groove 15 are formed in a state of forming groove cross sections of shapes respectively corresponding to a cross-sectional shape of the conductor end 7 described below. A chamfered shape or an R shape 17 is disposed in the end of the opening side of the groove 13. The conductor end 7 is fitted into the groove 13 smoothly and surely by this chamfered shape or the R shape 17.

Figure 3:
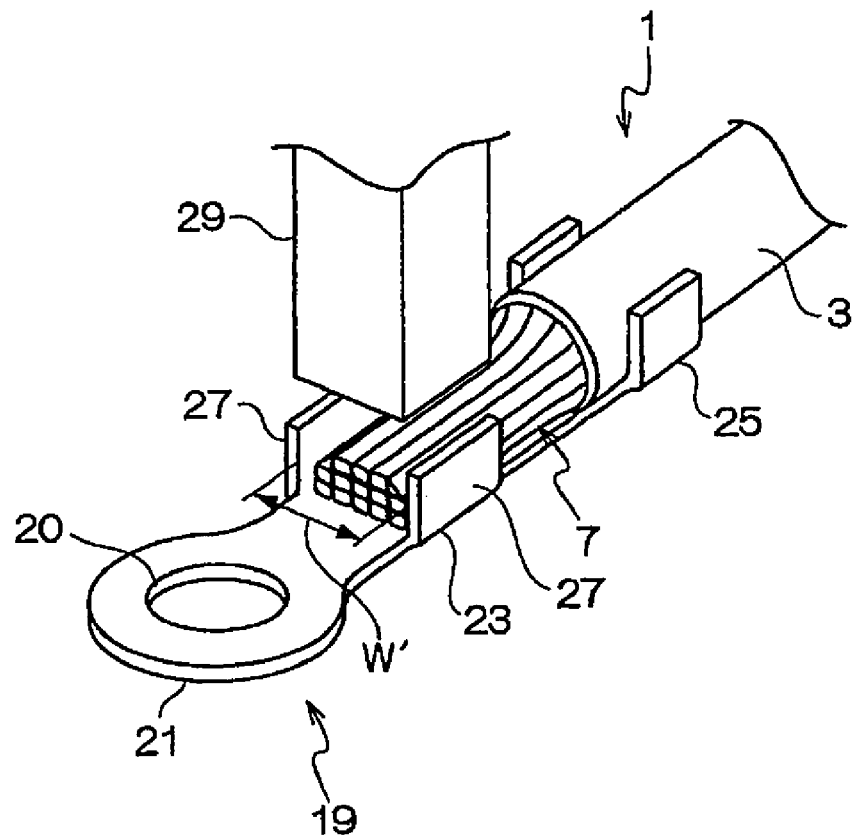
FIG. 3 is a perspective view describing a step of performing ultrasonic bonding of the conductor end of the electric wire molded by press to a connection terminal in the ultrasonic bonding method of the electric wire to which the invention is applied.

A connection terminal 19 includes a connection part 21 in which a through hole 20 for connecting an object is formed, a plate-shaped basal part 23 with a recessed cross section formed continuously with this connection part 21, the basal part 23 in which ultrasonic welding of the conductor end 7 of the electric wire 1 is performed, and a fixing part 25 with a recessed cross section which is formed continuously with the plate-shaped basal part 23 and fixes the electric wire 1 (the portion of the insulating outer skin 3) as shown in FIG. 3. The plate-shaped basal part 23 is formed by erecting two side walls 27 from both sides of a bottom surface. In addition, in the plate-shaped basal part 23 of the embodiment, the side walls 27 are formed by folding both sides of the bottom surface substantially perpendicularly, but the side walls 27 may have a structure of being fastened to both sides of the bottom surface.

The ultrasonic bonding apparatus is constructed so that a bonded object (the connection terminal 19 in which the conductor end 7 of the electric wire 1 is set) is placed on an anvil (not shown) and a lower end surface of a pressurization and vibration horn 29 (FIG. 3) is abutted on a bonded region (the conductor end 7) and thereby ultrasonic vibration oscillated by an ultrasonic oscillator (not shown) is applied to the bonded region.

Next, an operation of the ultrasonic bonding method of the electric wire of the embodiment will be described.

First, as shown in FIG. 1, the insulating outer skin 3 of the electric wire 1 is peeled and the conductor end 7 made of the plural core wires 5 is exposed. Next, as shown in FIG. 2, a width direction is regulated by a groove width W in a state of setting the exposed conductor end 7 inside the groove 13 of the lower mold 9 of the press metal mold. Here, the groove width W is set according to a distance W' between the side walls 27 of the connection terminal 19.

Figure 4:
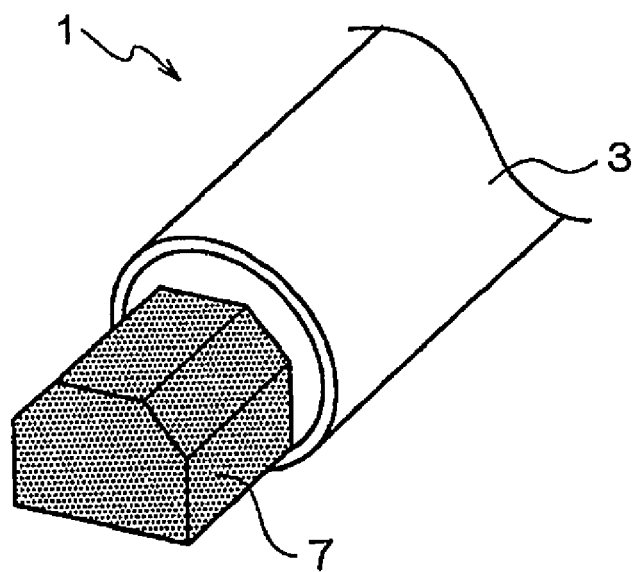
FIG. 4 is a perspective view showing a structure of the electric wire in which the conductor end is molded by press in the ultrasonic bonding method of the electric wire to which the invention is applied.

In this state, the upper mold 11 is moved downward in a direction of arrow A and the conductor end 7 is pressurized in a thickness direction. Consequently, the conductor end 7 is formed in a shape according to a shape formed by butting the groove 13 and the groove 15. In the embodiment, a cross section of the groove 13 is formed in a rectangular shape and a cross section of the groove 15 is formed in a trapezoidal shape. As a result of this, the conductor end 7 is molded so that the cross section of the portion corresponding to the side of the groove 13 is formed in the rectangular shape and the cross section of the portion corresponding to the side of the groove 15 is formed in the trapezoidal shape as shown in FIG. 4. In addition, in FIG. 4, the core wires 5 are omitted and an outline shape of the conductor end 7 is shown.

Then, as shown in FIG. 3, the conductor end 7 of the electric wire 1 molded by press is positioned in the plate-shaped basal part 23 of the connection terminal 19, that is, the bottom surface between the side walls 27 and this connection terminal 19 is placed on the anvil. Then, the conductor end 7 is bonded to the plate-shaped basal part 23 by applying ultrasonic vibration while pressurizing the conductor end 7 by the pressurization and vibration horn 29.

Figure 6:
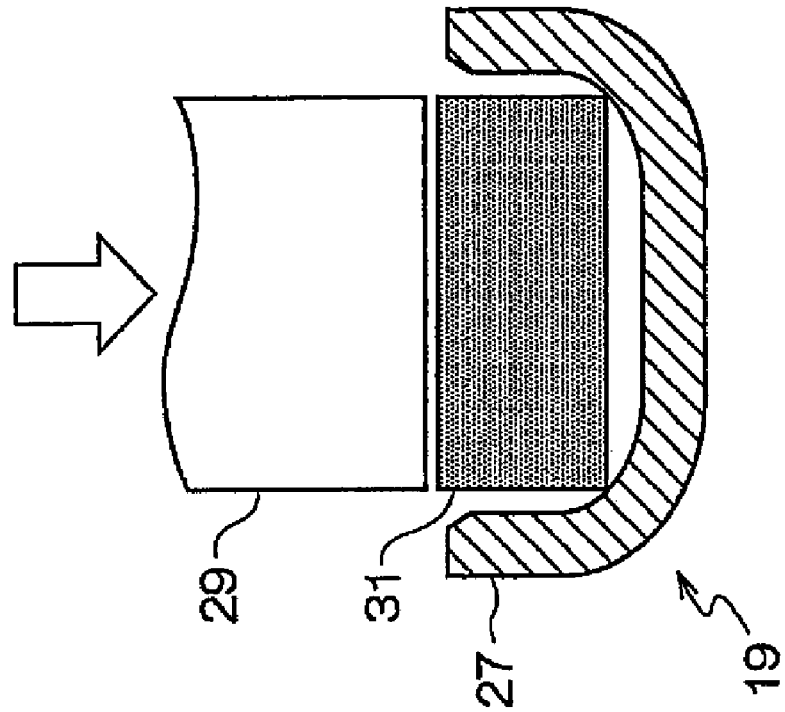
FIG. 6 is diagrams of cross-sectional shapes before and after ultrasonic bonding of a conductor end of an electric wire molded by press is performed to a connection terminal in a conventional ultrasonic bonding method of the electric wire.

Incidentally, when a conventional conductor end whose cross section is formed in a rectangular shape is set in the plate-shaped basal part 23 of the connection terminal 19 and ultrasonic vibration is applied to the conductor end while pressurizing the conductor end (FIG. 6(a)), the conductor end 31 is pushed on the pressurization and vibration horn 29 and becomes deformed so as to spread in a width direction between the side walls 27 and the core wires 5 of the sides of the side walls 27 become pushed on the side walls 27. When further application of ultrasonic vibration is continued, the core wires 5 pushed on the side walls 27 swell in a thickness direction along the side walls 27 and may reach a position higher than the upper ends of the side walls 27 (FIG. 6(b)). The core wires 5 swelling to the position higher than the side walls 27 thus, for example, tend to become an obstacle in the case of insertion into a housing into which the connection terminal 19 is inserted, and may also cause electrical trouble such as a short circuit in the case of having a deficiency of the core wires 5.

Figure 5:
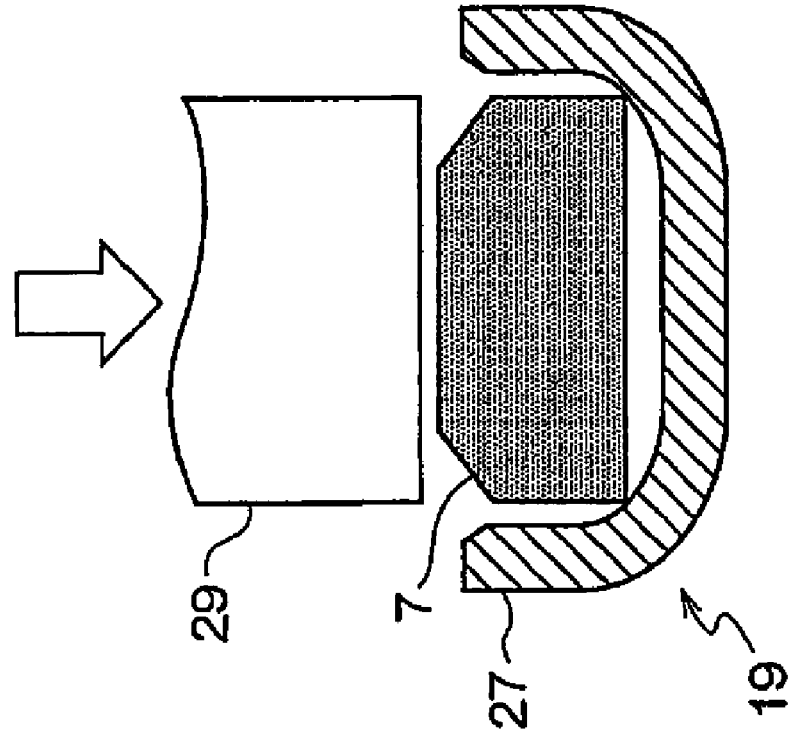
FIG. 5 is diagrams of cross-sectional shapes before and after ultrasonic bonding of the conductor end of the electric wire molded by press is performed to the connection terminal in the ultrasonic bonding method of the electric wire to which the invention is applied.

On the other hand, in the embodiment, a cross section of the conductor end 7 of the electric wire 1 is formed in substantially a trapezoidal shape as a whole. That is, the cross section of the conductor end 7 is formed so that a thickness of a width direction between the side walls 27 becomes thin toward the side to which the ultrasonic vibration is applied and a thickness of a direction pushed on the pressurization and vibration horn 29 becomes thin toward the sides of the side walls 27 as shown in FIG. 5. As a result of this, even when the conductor end 7 is pushed on the pressurization and vibration horn 29 and becomes deformed so as to spread in the width direction between the side walls 27, the amount of the core wires 5 pushed on the side walls 27 is smaller than the conductor end 31 of FIG. 6, so that swelling of the core wires 5 along the side walls 27 can be suppressed.

In the embodiment, the example in which the thickness of the width direction between the side walls 27 becomes thin toward the side to which the ultrasonic vibration is applied in the cross section of the conductor end 7 of the electric wire 1 has been described, but it is not limited to this example, and the cross section of the conductor end 7 could be formed so that the thickness of the width direction between the side walls 27 becomes thin toward at least one of the side positioned in the bottom surface between the side walls 27 of the connection terminal 19 and the side to which the ultrasonic vibration is applied.

In the press metal mold of the embodiment, a state in which the upper mold 11 moves downward to the lowest portion with respect to the lower mold 9 is shown in FIG. 7(a) and the cross section of the conductor end 7 after press molding is shown in FIG. 7(b). By forming the grooves 13, 15 of the shape corresponding to the cross-sectional shape of the conductor end 7 in the press metal mold thus, the conductor end 7 can easily be formed in a desired cross-sectional shape. Here, the width W of the groove 13 is set according to the distance W' between the side walls 27 of the connection terminal 19, but could be set in a range in which the conductor end 7 does not wobble when the conductor end 7 is set between the side walls 27 of the connection terminal 19 and pressure and vibration are applied to the conductor end 7.

Figure 7:
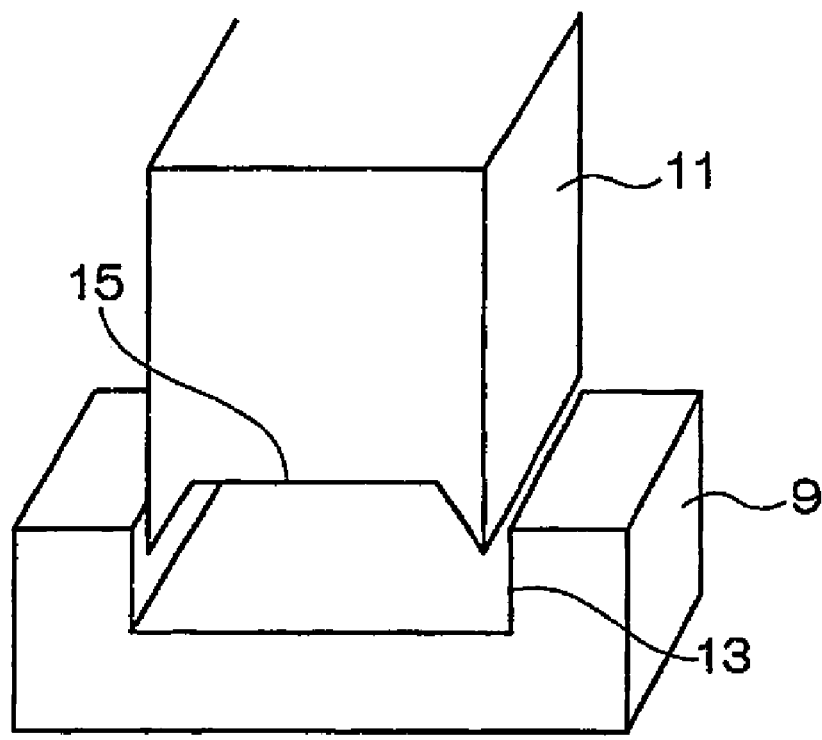
FIG. 7 is diagrams describing a step of molding the conductor end of the electric wire by press in the ultrasonic bonding method of the electric wire to which the invention is applied.
Figure 7:
Figure 8:
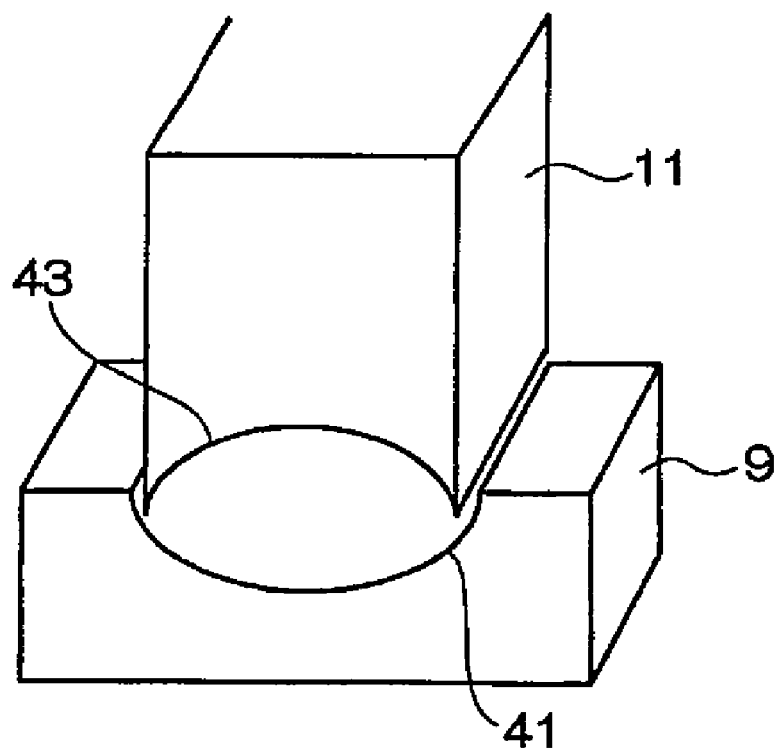
FIG. 8 is diagrams describing an example using a press metal mold different from that of FIG. 7.
Figure 8:
Figure 9:
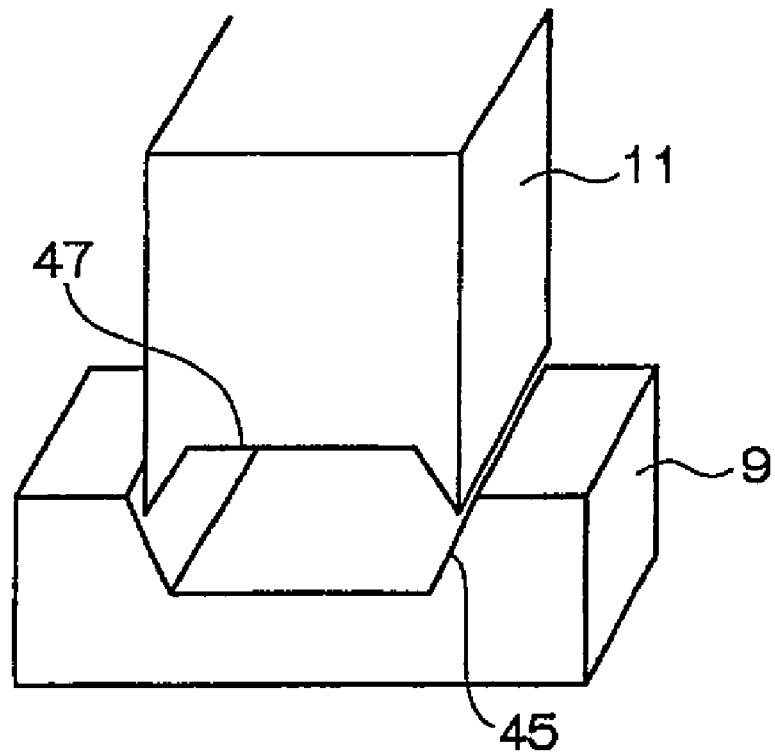
FIG. 9 is diagrams describing an example using a press metal mold different from those of FIGS. 7 and 8.
Figure 9:
Figure 10:
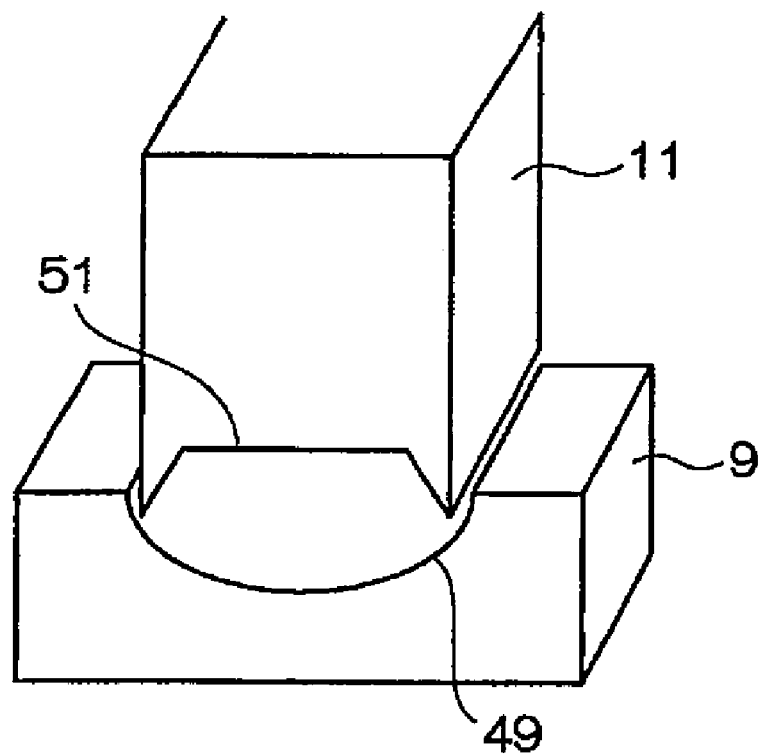
FIG. 10 is diagrams describing an example using a press metal mold different from those of FIGS. 7 to 9.
Figure 10:
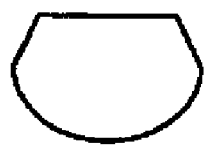
Figure 11:
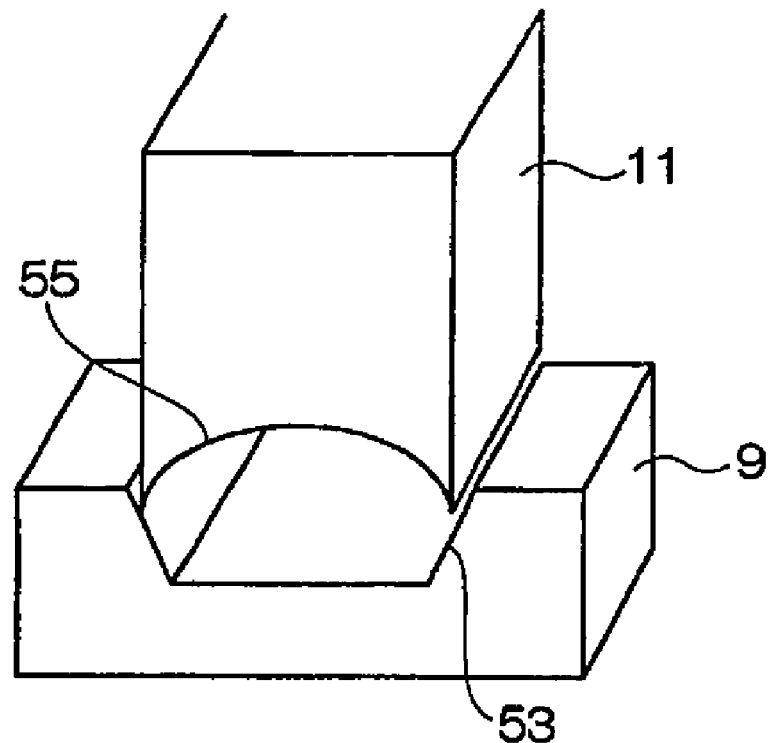
FIG. 11 is diagrams describing an example using a press metal mold different from those of FIGS. 7 to 10.
Figure 11:

Next, embodiments of other press metal molds different from the press metal mold of FIG. 7 will be described with reference to FIGS. 8 to 11. All the press metal molds shown in FIGS. 8 to 11 are similar to the press metal mold of FIG. 7 in that a lower mold 9 and an upper mold 11 are included, but differ in that a groove cross-sectional shape of at least one of a groove formed in the lower mold 9 and a groove formed in the upper mold 11 is different from the groove cross-sectional shapes of the grooves 13, 15 of FIG. 7, respectively.

In the press metal mold of FIG. 8(a), both of cross sections of a groove 41 of the lower mold 9 and a groove 43 of the upper mold 11 are formed in an elliptical circular arc shape, so that the conductor end 7 molded by press is formed in an elliptical shape as shown in FIG. 8(b).

In the press metal mold of FIG. 9(a), both of cross sections of a groove 45 of the lower mold 9 and a groove 47 of the upper mold 11 are formed in a trapezoidal shape, so that the conductor end 7 molded by press is formed in a hexagonal shape as shown in FIG. 9(b).

In the press metal mold of FIG. 10(a), a cross section of a groove 49 of the lower mold 9 is formed in an elliptical circular arc shape and a cross section of a groove 51 of the upper mold 11 is formed in a trapezoidal shape, so that the conductor end 7 molded by press is formed in a shape in which a trapezoid is combined with substantially a semicircle of an elliptical shape as shown in FIG. 10(b).

In the press metal mold of FIG. 11(a), a cross section of a groove 53 of the lower mold 9 is formed in a trapezoidal shape and a cross section of a groove 55 of the upper mold 11 is formed in an elliptical circular arc shape, so that the conductor end 7 molded by press is formed in a shape in which a trapezoid is combined with substantially a semicircle of an elliptical shape as shown in FIG. 11(b), that is, a shape in which the shape of FIG. 10(b) is inverted vertically.

All the conductor ends 7 molded by the press metal molds of FIGS. 8 to 11 are formed so that the thickness of the width direction between the side walls 27 in a state of setting the conductor end 7 between the side walls 27 of the connection terminal 19 becomes thin toward both of the side positioned in the bottom surface between the side walls 27 of the connection terminal 19 and the side to which the ultrasonic vibration is applied. That is, the thickness of the direction pushed on the pressurization and vibration horn 29 becomes thinner toward the sides of the side walls 27 than that of the conductor end 7 molded by the press metal mold of FIG. 7. Therefore, even when the conductor end 7 is pushed on the pressurization and vibration horn 29 and becomes deformed so as to spread in the width direction between the side walls 27, the amount of the core wires 5 pushed on the side walls 27 can be made smaller, so that swelling of the core wires 5 along the side walls 27 can be suppressed further.

Also, in the press metal molds of FIGS. 7 to 11, the examples of forming the cross sections of the grooves respectively formed in the lower mold 9 and the upper mold 11 in the elliptical circular arc shape or the trapezoidal shape have been described, but it is not limited to these examples, and in brief, as long as the cross section of the conductor end 7 molded by press is formed so that the thickness of the direction pushed on the pressurization and vibration horn 29 becomes thin toward the sides of the side walls 27, the shape is not limited to these shapes.

What is claimed is:

1. An ultrasonic bonding method of an electric wire comprising:
    exposing the electric wire in a conductor end made of plural core wires;
    providing a metallic connection terminal formed by erecting two side walls from a bottom surface;
    providing a press metal mold separately from the metallic connection terminal;
    molding the conductor end of the electric wire by the press metal mold, into a cross section having a thickness which tapers along a width direction of the cross section toward at least one of a side positioned in the bottom surface of the connection terminal and a side to which ultrasonic vibration is to be applied;
    positioning the molded conductor end in the connection terminal;
    after completion of the molding step, bonding the conductor end to the connection terminal by applying ultrasonic vibration with a pressurization and vibration horn to the conductor end of the electric wire which is positioned on the bottom surface between the two side walls of the connection terminal, wherein, in the bonding step, an entire upper surface of the conductor end is changed from a tapered shape having the thickness to a flat shape.

2. The ultrasonic bonding method of an electric wire as claimed in claim 1, wherein the cross section of the conductor end of the electric wire is made by forming at least one of the side positioned in the bottom surface and the side to which the ultrasonic vibration is applied in a trapezoidal shape or a semicircular shape.

3. The ultrasonic bonding method of an electric wire as claimed in claim 1, wherein the press metal mold includes an upper mold having a lower end surface in which a groove is formed corresponding to a shape of the cross section of the conductor end of the electric wire that includes the side to which the ultrasonic vibration is applied.

4. The ultrasonic bonding method of an electric wire as claimed in claim 1, wherein the ultrasonic vibration is performed by a pressurization and vibration horn having a lower end surface in a planar shape which abuts the conductor end during bonding.

5. The ultrasonic bonding method of an electric wire as claimed in claim 3, wherein the groove formed on the lower end surface of the upper mold has a trapezoidal shape.

6. The ultrasonic bonding method of an electric wire as claimed in claim 3, wherein the press metal mold further includes a lower mold having a groove formed in a shape corresponding to the side of the conductor wire positioned in the bottom surface of the connection terminal.

7. The ultrasonic bonding method of an electric wire as claimed in claim 6, wherein the groove on the lower mold has one of an elliptical circular arc shape and a trapezoidal shape.

8. An ultrasonic bonding method of an electric wire comprising:

exposing the electric wire in a conductor end made of plural core wires;

providing a metallic connection terminal formed by erecting two side walls from a bottom surface;

providing a press metal mold separately from the metallic connection terminal;

molding the conductor end of the electric wire by the press metal mold, into a cross section having a thickness which tapers along a width direction of the cross section toward at least one of a side positioned in the bottom surface of the connection terminal and a side to which ultrasonic vibration is to be applied;

positioning the molded conductor end in the connection terminal;

after completion of the molding step, bonding the conductor end to the connection terminal by applying ultrasonic vibration with a pressurization and vibration horn to the conductor end of the electric wire which is positioned on the bottom surface between the two side walls of the connection terminal, wherein the cross-section of the molded conductor end is different from a shape of a cross-sectional area defined by the bottom surface of the connection terminal, the two side walls of the connection terminal and a lower end surface of the pressurization and vibration horn.

* * * * *